United States Patent
Miyashita

(10) Patent No.: US 7,569,961 B2
(45) Date of Patent: Aug. 4, 2009

(54) ROTOR FOR MOTORS

(75) Inventor: Toshihito Miyashita, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 275 days.

(21) Appl. No.: 11/755,102

(22) Filed: May 30, 2007

(65) Prior Publication Data
US 2007/0278885 A1    Dec. 6, 2007

(30) Foreign Application Priority Data

| | | |
|---|---|---|
| May 31, 2006 | (JP) | ............................. 2006-152238 |
| Dec. 20, 2006 | (JP) | ............................. 2006-343228 |

(51) Int. Cl.
H02K 21/12    (2006.01)
H02K 1/27     (2006.01)

(52) U.S. Cl. .............................. 310/156.47; 310/156.43; 310/156.45

(58) Field of Classification Search ............ 310/156.08, 310/156.25, 156.33, 156.36, 156.4–156.47, 310/218
See application file for complete search history.

(56) References Cited

U.S. PATENT DOCUMENTS

| | | | |
|---|---|---|---|
| 5,140,210 A | | 8/1992 | Shirakawa |
| 5,760,520 A | * | 6/1998 | Hasebe et al. ................ 310/261 |
| 5,886,440 A | | 3/1999 | Hasebe et al. |
| 6,252,323 B1 | * | 6/2001 | Nishikawa et al. ..... 310/156.01 |
| 6,657,349 B2 | * | 12/2003 | Fukushima ............ 310/156.47 |
| 6,707,209 B2 | * | 3/2004 | Crapo et al. ........... 310/156.43 |
| 6,788,013 B2 | * | 9/2004 | Islam et al. .................. 318/432 |
| 7,067,948 B2 | * | 6/2006 | Yamaguchi et al. .... 310/156.47 |

| | | |
|---|---|---|
| 2003/0117032 A1 | 6/2003 | Komuro et al. |

FOREIGN PATENT DOCUMENTS

| | | |
|---|---|---|
| JP | 60-102850 | 6/1985 |
| JP | 01-122353 | 5/1989 |

(Continued)

*Primary Examiner*—Tran N Nguyen
(74) *Attorney, Agent, or Firm*—Rankin, Hill & Clark LLP

(57) ABSTRACT

The present invention provides a rotor for motors, in which motor torque is kept high and generation of torque ripples is reduced, and what is more, detecting accuracy of a magnetic pole position is not deteriorated. The present invention provides a rotor assembly having a first divided rotor magnetic pole unit 15 and a second divided rotor magnetic pole unit 17 are disposed side by side on a surface of a rotor core 13 in an axial direction of a rotary shaft 11. The first divided rotor magnetic pole unit 15 includes P (P is a positive even number) permanent magnet magnetic pole portions 21 of a first kind and P (P is the positive even number) salient pole portions 23 made of a magnetic material, which are alternately disposed in a circumferential direction of the rotary shaft 11. The second divided rotor magnetic pole unit 17 includes P (P is the positive even number) permanent magnet magnetic pole portions 25 of a second kind which are spaced on another part of the surface of the rotor core 13 in the circumferential direction of the rotary shaft ii. A spacer 27 made of a soft magnetic material is disposed in a gap, which is formed due to manufacturing size precision of the permanent magnet magnetic pole portion, between two adjacent permanent magnet magnetic portions of the P permanent magnet magnetic pole portions of the second kind.

14 Claims, 11 Drawing Sheets

FOREIGN PATENT DOCUMENTS

| | | | |
|---|---|---|---|
| JP | 10-051985 | | 2/1998 |
| JP | 2000-069719 | | 3/2000 |
| JP | 2000308286 A | * | 11/2000 |
| JP | 2001314050 A | * | 11/2001 |
| JP | 2001359266 A | * | 12/2001 |
| JP | 2002-272066 | | 9/2002 |
| JP | 2004140911 A | * | 5/2004 |
| JP | 2005-045978 | | 2/2005 |
| JP | 2005-057855 | | 3/2005 |

* cited by examiner

ROTOR FOR MOTORS

FIELD OF THE INVENTION

The present invention relates to a rotor for motors.

BACKGROUND OF THE INVENTION

A conventional rotor for motors is equipped with P (P denotes a number and in this example, P is two) permanent magnets 101 which are disposed on a surface of a rotor core disposed on a rotary shaft in a circumferential direction of the rotary shaft and arranged to be adjacent to each other, as shown in FIG. 18. However, a motor which employs a rotor of this kind has the following problems: high-frequency current ripples are generated by carrier frequency of an inverter to induce higher harmonic iron loss in a stator core and a permanent magnet of the motor, and what is more, torque ripples are increased. At high speed rotation, so-called field-weakening control is carried out to suppress an increase in induction voltage by advancing a current phase angle. This leads to a rapid decrease in torque. Then, as shown in FIG. 19 (Patent Reference 1: Japanese Patent No. 3659012), a rotor for motors has been proposed, including two permanent magnets 101 and two salient poles 103 made of a magnetic material, which are alternately disposed in a circumferential direction of a rotary shaft. In this rotor for motors, the generation of torque ripples is suppressed due to the existence of the salient poles 103.

Japanese Patent Publication No. 08-23664 (Patent Reference 2) has disclosed a rotor for motors which comprises first and second divided rotor magnetic pole units. The first divided rotor magnetic pole unit includes a plurality of permanent magnet magnetic pole portions of a first kind and a plurality of salient pole portions of a first kind made of a magnetic material, which are arranged alternately on a surface of a rotor core in a circumferential direction of a rotary shaft. The second divided rotor magnetic pole unit includes a plurality of permanent magnet magnetic pole portions of a second kind and a plurality of salient pole portions of a second kind made of a magnetic material, which are arranged alternately on the surface of the rotor core in the circumferential direction of the rotary shaft. In this rotor for motors, the generation of torque ripples is suppressed by arranging a pole arc angle of the permanent magnet magnetic pole portion of the first kind and that of the permanent magnet magnetic pole portion of the second kind to be different, and by arranging an open angle of the salient pole portion of the first kind and that of the salient pole portion of the second kind to be different.

Japanese Patent Publication No. 01-122353 has shown in FIG. 6 a rotor for motors, which comprises a rotor core, and first and second divided rotor magnetic pole units. The first divided rotor magnetic pole unit includes p (P is a positive even number) permanent magnet magnetic pole portions of a first kind which are disposed on a surface of the rotor core. The second divided rotor magnetic pole unit includes P (P is the positive even number) permanent magnet magnetic pole portions of a second kind which are disposed on the surface of the rotor core. A pole arc angle of the permanent magnetic pole portion of the first kind is smaller than that of the permanent magnet magnetic pole portion of the second kind. As shown in FIGS. 1 and 16 of this publication, however, permanent magnets 12a, 12b are joined onto a yoke 9. An outer surface of the yoke 9 is merely exposed between adjacent permanent magnets in the circumferential direction.

Japanese Patent Publication No. 2002-272066 has shown in FIG. 6 a rotor for motors, in which a magnetic binder 20 is filled into between permanent magnets 35 disposed on a yoke 11. The magnetic binder has been obtained by kneading permanent magnetic powder with an adhesive agent. However, the rotor shown in this publication is not equipped with first and second divided rotor magnetic pole units. In this rotor, gaps formed between the adjacent permanent magnets 35 are large in size and are formed when the permanent magnets 35 are disposed on the polygonal yoke 11. These gaps are not due to size precision of the permanent magnet magnetic pole portions. In this publication, the binder 20 to be filled into between the permanent magnets 35 is obtained by kneading permanent magnetic powder with an adhesive agent, and is called as a magnetic binder. The permanent magnet powder used in the binder 20 is a ferromagnetic material having high retention. It is a magnetic material having high magnetic resistance. The binder 20 including the permanent magnet powder works to extend the adjacent permanent magnets and make a portion filled with the binder 20 equivalent to the permanent magnet, thereby reducing cogging torque.

A motor which uses such kind of rotor for motors includes a Hall element for detecting a magnetic pole position disposed on a stator, in order to switch current to an armature of the stator in accordance with a position of the rotor. The Hall element for detecting a magnetic pole position is usually disposed in the vicinity of an edge of the permanent magnet that is located in the axial direction of the rotary shaft. However, in the rotor having the salient pole portion like the one shown in FIG. 19 (refer to Patent Reference 1), disturbance of magnetic flux T1 occurs in the vicinity of the zero crosses of a flux density wave (wave indicative of a relationship between the rotation angle of the rotor and density magnetic flux leaking out from the gap in the axial direction) which is detected by the Hall element for detecting a magnetic pole position, as shown in FIG. 20. Accordingly, the flux density wave may hardly be formed in a waveform of sine wave, causing a detection error of the magnetic pole position. Although the existence of the salient pole portion may reduce the torque ripples, a motor torque will be reduced.

In the rotor that does not have the salient pole portion like the one shown in FIG. 18, although no significant reduction of the motor torque is observed, the torque ripples cannot be reduced. In this rotor, a gap is formed due to size precision of the permanent magnet between the permanent magnets. The gap may cause disturbance of magnetic flux T2 in the flux density wave, as shown in FIG. 21.

Also in the rotor for motors disclosed in Patent Reference 2, disturbance of magnetic flux may occur in the vicinity of the zero crosses of the flux density wave and the wave may hardly be formed in a sine wave, possibly causing malfunction.

SUMMARY OF THE INVENTION

It is an object of the present invention to provide a rotor for motors and a permanent magnet rotary motor in which the motor torque is kept high and generation of torque ripples is reduced, and what is more, detecting accuracy of a magnetic pole position is not deteriorated.

It is another object of the present invention to provide a rotor for motors and a permanent magnet rotary motor in which disturbance of magnetic flux is hardly generated in the flux density wave detected by a Hall element for detecting a magnetic pole position, and the flux density wave may be formed in a sine wave.

It is a further object of the present invention to provide a rotor for motors and a permanent magnet rotary motor in which the torque ripples can be suppressed to keep the torque high, and higher harmonic iron loss can be suppressed even at high speed rotation.

It is still another object of the present invention to provide a rotor for motors and a permanent magnet rotary motor in which a permanent magnet and a salient pole can be prevented from coming off from a rotor core even at high speed rotation.

A rotor for motors of the present invention comprises a rotor core disposed on a rotary shaft, a first divided rotor magnetic pole unit, and a second divided rotor magnetic pole unit. The first divided rotor magnetic pole unit includes P (P is a positive even number) permanent magnet magnetic pole portions of a first kind and P (P is the positive even number) salient pole portions made of a magnetic material. The permanent magnet magnetic pole portions and the salient pole portions are alternately disposed on a surface of the rotor core in a circumferential direction of the rotary shaft. The second divided rotor magnetic pole unit includes P (P is the positive even number) permanent magnet magnetic pole portions of a second kind disposed adjacent to each other on the surface of the rotor core in the circumferential direction of the rotary shaft.

The first divided rotor magnetic pole unit and the second divided rotor magnetic pole unit are disposed side by side in an axial direction of the rotary shaft so that a first virtual centerline extending along an axis line of the rotary shaft and passing through the center of the permanent magnet magnetic pole portion of the first kind may coincide with a second virtual centerline extending along the axis line and passing through the center of the permanent magnet magnetic pole portion of the second kind.

The "permanent magnet magnetic pole portion" is defined as a magnetic pole portion which is formed by one or more permanent magnets. For example, one permanent magnet magnetic pole portion may be formed by a permanent magnet, or by arranging two or more permanent magnets of which surfaces have the same polarity. The "salient pole portion" is defined as a portion that is formed by one or more salient poles.

When the salient pole portion is disposed in the first divided rotor magnetic pole unit as with the rotor for motors of the present invention, reluctance torque is generated in this salient pole portion to suppress an increase in higher harmonic iron loss, and generation of torque ripples may be suppressed. Reduction of motor torque may be suppressed by using the second divided rotor magnetic pole unit that does not have a salient pole portion. However, a gap is formed due to size precision of the permanent magnet magnetic pole portion between two adjacent permanent magnet magnetic pole portions of the P permanent magnet magnetic pole portions of the second kind in the second divided rotor magnetic pole unit. This gap is generated because the size precision of the permanent magnet is determined in consideration of machining precision of the rotor core and assembly precision of the rotor. When actually manufacturing the rotor for motors, some measure or contrivance is needed to make the gap as small as possible in view of the machining precision and the assembly precision of each part or component. It is difficult to improve size precision of the permanent magnet that is used to form the permanent magnet magnetic pole portion. Actually, when the size precision of the permanent magnet is well improved, the price of the permanent magnets becomes extremely high. It is common to persons skilled in the art that rotors for motors are manufactured without improving the size precision of the permanent magnets. When a plurality of the permanent magnet magnetic poles are arranged adjacent to each other in the circumferential direction of the rotary shaft, a gap is inevitably formed between two adjacent permanent magnet magnetic pole portions. Generally, the dimension of such gap is about 0.2 to 0.5 mm as measured in the circumferential direction. However, the gap causes disturbance generated in the flux density wave of the second divided rotor magnetic pole unit. Then, in the present invention, a spacer made of a soft magnetic material is disposed in the gap. When such spacer made of a soft magnetic material is arranged, disturbance of the flux density wave is suppressed, and the waveform of the flux density wave is close to a sine wave.

It is preferred that a ratio of a pole arc angle $\theta m$ of the permanent magnet magnetic pole portion of the first kind to an open angle $\theta s$ of the salient pole portion (that is, $\theta m/\theta s$) is in the range of 1.5 to 2.5. If the ratio ($\theta m/\theta s$) is less than 1.5, torque will drop and the torque ripples are likely to increase. If the ratio ($\theta m/\theta s$) exceeds 2.5, the torque at high speed rotation drops and higher harmonic iron loss cannot be fully suppressed. In this case, it is preferred that a ratio of a length L1 of the first divided rotor magnetic pole unit in the axial direction to a length L2 of the second divided rotor magnetic pole unit in the axial direction (that is, L1/L2) is in the range of 0.75 to 1.

When the length L1 of the first divided rotor magnetic pole unit in the axial direction is equal to the length L2 of the second divided rotor magnetic pole unit in the axial direction, an increase in the higher harmonic iron loss may be suppressed.

It is preferred that the permanent magnet magnetic pole portions of the first kind and the permanent magnet magnetic pole portions of the second kind are respectively magnetized so that magnetization directions thereof may be oriented in parallel to a third virtual centerline which passes through the center of the rotary shaft and the center of the first or second permanent magnet magnetic pole portion, and is orthogonal to the first or second virtual line. In this manner, the waveform of the flux density wave detected by the Hall element for detecting a magnetic pole position may be closer to a sine wave.

It is preferred that a protective layer is provided on outer circumferential surfaces of the first and second rotor magnetic pole units. The protective layer is formed by winding a yarn made of a reinforced fiber material around the outer circumferential surfaces, and impregnating the yarn with an adhesive agent to fix the yarn thereto. With this arrangement, even when the rotor magnetic pole is formed by the two (the first and the second) divided rotor magnetic pole units, the protective layer may prevent the divided rotor magnetic pole units from coming off from the rotor core due to centrifugal force even at high speed rotation.

Especially, the suppressive effect of the disturbance of the flux density wave, which has been attained in the present invention, is remarkably exhibited in a high speed rotary motor, in which detection of the magnetic pole position substantially influences the control of the motor. The high speed rotary motor is defined as a motor in which the rotary shaft rotates at a high speed of 150,000 rotations per minute or more. In such high speed rotary motor, since deterioration of the detecting accuracy of the magnetic pole position caused by the disturbance of the flux density wave greatly reduces the control accuracy of the motor, the effect attained in the present invention is very remarkable.

In a permanent magnet rotary motor provided with the rotor for motors of the present invention, a Hall element for detecting a magnetic pole position for the rotor for motors is disposed to measure leakage flux leaking out of the permanent magnet magnetic pole portion of the second kind. With this arrangement, as mentioned above, the disturbance of the magnetic flux is hardly generated in the flux density wave detected by the Hall element for detecting a magnetic pole position, and the waveform of the flux density wave is close to a sine wave to suppress malfunction in controlling the motor.

According to the rotor for motors of the present invention, reluctance torque is generated in the salient pole portion by disposing the salient pole portion in the first divided rotor magnetic pole unit, and an increase in higher harmonic iron loss may be suppressed. In the second divided rotor magnetic pole unit, since the permanent magnet magnetic pole portions of the second kind are disposed adjacent to each other, lowering of motor torque may be suppressed. Moreover, in the present invention, the spacer made of a soft magnetic material is inserted in the gap formed due to size precision of the permanent magnet magnetic pole portion between two adjacent permanent magnet magnetic pole portions of a plurality of the permanent magnet magnetic pole portions in the second divided rotor magnetic pole unit. The soft magnetic material has small retention but large relative magnetic permeability (small magnetic resistance). By disposing the spacer made of the soft magnetic material in the gap between permanent magnet magnetic pole portions, the magnetic resistance in the gap may be reduced. Consequently, disturbance of the flux density wave of the leakage flux leaking out of the second divided rotor magnetic pole unit may be suppressed to make the waveform of the flux density wave closer to a sine wave. As a result, lowering of detecting accuracy of the magnetic pole position may be suppressed.

DETAILED DESCRIPTION OF THE PREFERRED EMBODIMENTS

Figure 1:
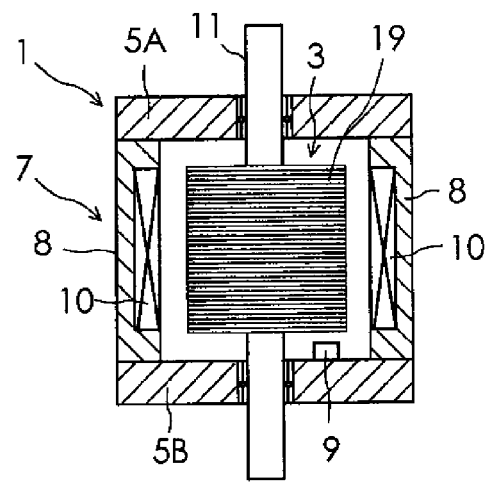
FIG. 1 is a partial cross-sectional view of a permanent magnet rotary motor according to one embodiment of the present invention.

Preferred embodiments of the present invention will now be described in detail with reference to the drawings. FIG. 1 is a partial cross-sectional view of a permanent magnet rotary motor according to one embodiment of the present invention. In the figure, the rotor for motors is drawn in a top plan view, and other portions are drawn in a cross-sectional view for easier understanding. As shown in FIG. 1, the motor of the present embodiment includes a stator 1 for motors and a rotor 3 for motors. The stator 1 has a pair of brackets 5A, 5B, and an armature 7. The pair of brackets 5A, 5B rotatably supports the rotor 3. A Hall element 9 for detecting a magnetic pole position for the rotor 3 is attached to one bracket 5B of the pair of brackets 5A, 5B. The Hall element 9 for detecting a magnetic pole position is disposed about 1 mm apart from an edge of a permanent magnet magnetic pole portion of a second kind 25, which will be described later, in order to detect leakage flux leaking out from the permanent magnet magnetic pole portion 25 of the second kind. The armature 7 includes an armature core 8 and a plurality of windings 10 wound on the armature core 8, and is supported by the pair of brackets 5A, 5B in a sandwiched relation.

Figure 2:
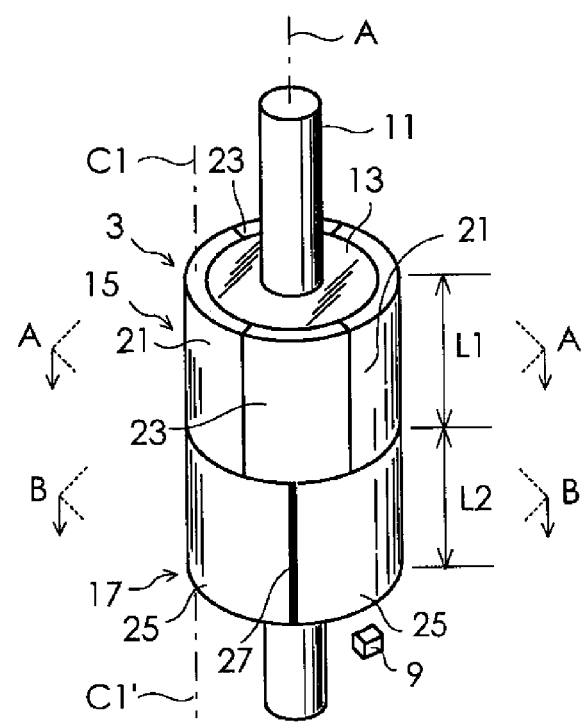
FIG. 2 is a perspective view of a rotor for motors used in the permanent magnet rotary motor shown in FIG. 1.
Figure 3:
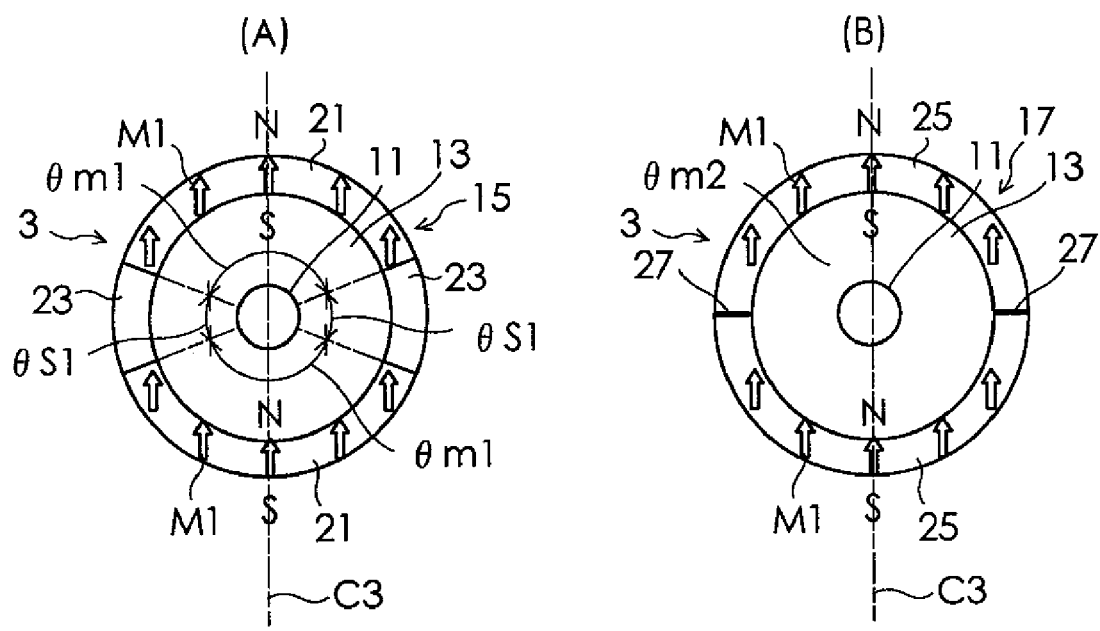
FIGS. 3A and 3B are cross-sectional views taken along lines A-A and B-B of FIG. 2, respectively.
Figure 4:
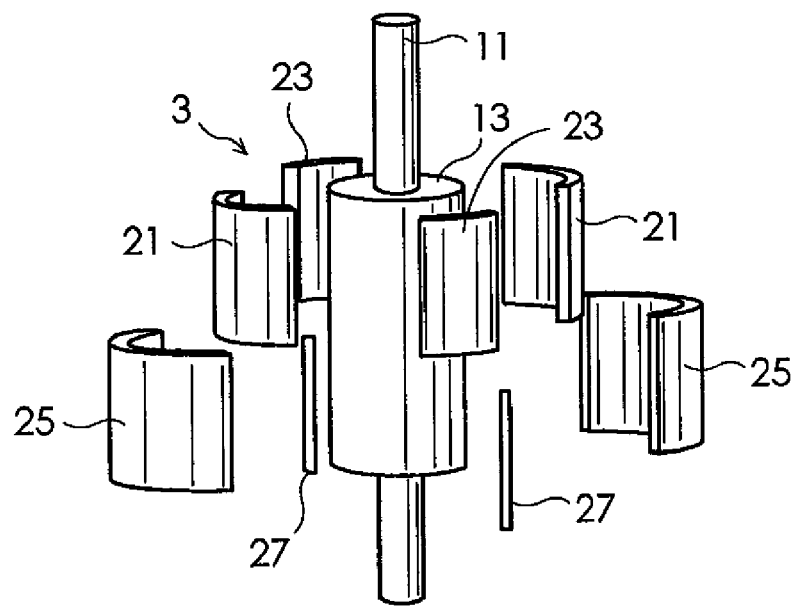
FIG. 4 is an exploded view of the rotor for motors shown in FIG. 2.

FIG. 2 is a perspective view of the rotor 3 for motors, and FIGS. 3A and 3B are cross-sectional views taken along lines A-A and B-B of FIG. 2 respectively. FIG. 4 is an exploded view of the rotor 3 for motors. A protective layer 19, which will be described later, is omitted from these views. For easier understanding, hatching that represents a cross section is omitted in FIGS. 3 A and 3B. As shown in FIGS. 1 to 4, the rotor 3 for motors includes a rotary shaft 11, a rotor core 13, a first divided rotor magnetic pole unit 15, a second divided rotor magnetic pole unit 17, and the protective layer 19. The rotor core 13 is cylindrical in shape and is integrally disposed on the central portion of the rotary shaft 11 in an axial direction thereof. The first divided rotor magnetic pole unit 15 includes P (P is a positive even number, two in this case) permanent magnet magnetic pole portions 21 of a first kind and P (P is the positive even number, two in this case) salient pole portions 23 made of a magnetic material. The permanent magnet magnetic pole portions 21 and the salient pole portions 23 are alternately disposed on a part of the surface of the rotor core 13 in a circumferential direction of the rotary shaft 11. The second divided rotor magnetic pole unit 17 includes P (P is the positive even number, two in this case) permanent magnet magnetic pole portions 25 of a second kind disposed adjacent to each other on another part of the surface of the rotor core 13. A spacer 27 made of a soft magnetic material is disposed in a gap, which is formed due to manufacturing size precision between two adjacent permanent magnet magnetic pole portions 25 of the permanent magnet magnetic pole portions 25 of the second kind. The thickness dimension of the gap, i.e., the dimension of the gap measured in the circumferential direction of the rotary shaft, is about 0.2 to 0.5 mm. Ideally, the gap may preferably be filled up completely with the spacer 27. However, since it is difficult to fill up the gap completely, two or more kinds of spacers having a different thickness dimension are prepared in advance. In the actual process of manufacturing the rotor for motors, the spacer 27 having the most appropriate thickness dimension to fill up the gap will be inserted in the gap. The spacer 27 may be a molded component formed by compaction molding ferrous-metal powder with a press, or may be formed from a thin plate obtained by reducing the thickness of a magnetic steel plate by means of flatting or metal rolling.

In the present embodiment, the permanent magnet magnetic pole portions 21, 25 of the first and second kinds are formed by one permanent magnet respectively. Each of the salient pole portions 23 is formed by one molded component formed by compaction molding ferrous-metal powder with a press. In addition, each of the spacers 27 made of a soft magnetic material is also formed by one molded component of ferrous-metal powder, which is molded by compaction molding using a press. As shown in FIG. 2, the first divided rotor magnetic pole unit 15 and the second divided rotor magnetic pole unit 17 are disposed side by side in the axial direction of the rotary shaft 11 so that a first virtual centerline C1 extending along an axis line A of the rotary shaft 11 and passing through the center of the permanent magnet magnetic pole portion 21 of the first kind may coincide with a second virtual centerline C1' extending along the axis line A and passing through the center of the permanent magnet magnetic pole portion 25 of the second kind.

The permanent magnet magnetic pole portions 21 of the first kind and the permanent magnet magnetic pole portions 25 of the second kind are respectively magnetized so that magnetization directions thereof may be oriented in parallel to a third virtual centerline C3 which passes through the center of the rotary shaft 11 and the center of the first or second permanent magnet magnetic pole portions, and is orthogonal to the first or second virtual line C1, C1', as shown in FIG. 3.

A length L1 of the first divided rotor magnetic pole unit 15 in the axial direction is equal to a length L2 of the second divided rotor magnetic pole unit 17 in the axial direction. It is preferred that a ratio of the length L1 to the length L2 (L1/L2) is within the range of 0.75 to 1. As mentioned above, the salient pole portion 23 is a molded component formed by compaction molding ferrous-metal powder with a press, and is provided separately from the rotor core 13.

As shown in FIG. 3, a ratio of a pole arc angle θm of the permanent magnet magnetic pole portion 21 of the first kind to an open angle θs of the salient pole portion 23 (that is, θm/θs) is in the range of 1.5 to 2.5.

Figure 5:
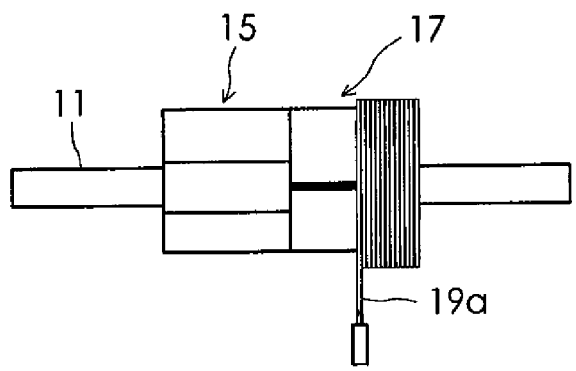
FIG. 5 illustrates how a protective layer is fixed onto outer circumferential surfaces of first and second divided rotor magnetic pole units of the rotor for motors shown in FIG. 2.

As shown in FIG. 5, the protective layer 19 fixed onto outer circumferential surfaces of the first and second rotor magnetic pole units 15, 17 (refer to FIG. 1) is formed by winding a tensioned yarn 19a, which is made of a reinforced fiber material, around the outer circumferential surfaces, and impregnating the yarn 19a with an adhesive agent to fix the yarn thereto.

Figure 6:
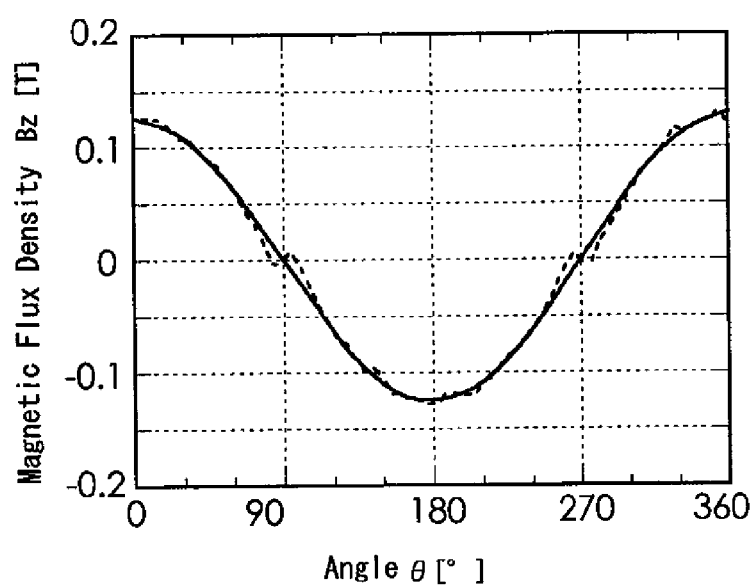
FIG. 6 illustrates a flux density wave detected by a Hall element for detecting a magnetic pole position for the permanent magnet rotary motor shown in FIG. 1.
Figure 7:
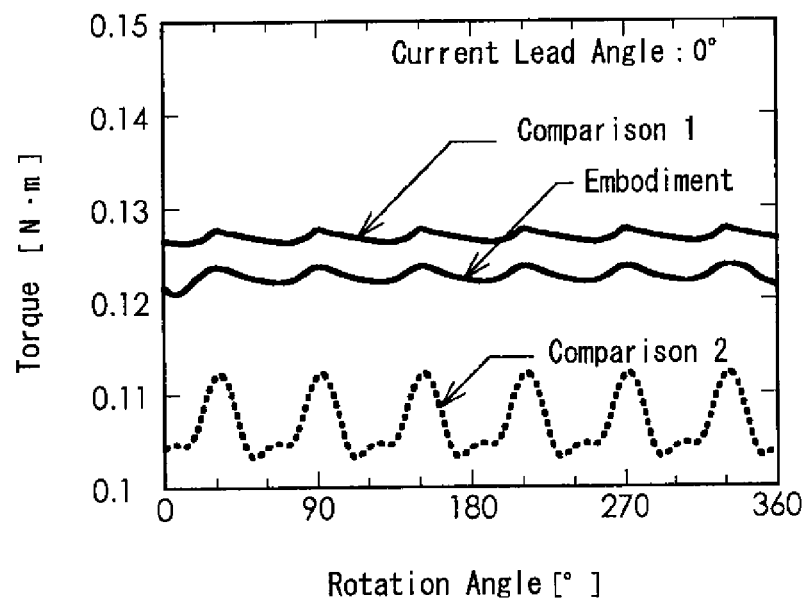
FIG. 7 illustrates a relationship between the torque and rotation angle of a rotor of each motor used in an experiment when a current lead angle is zero degree.
Figure 8:
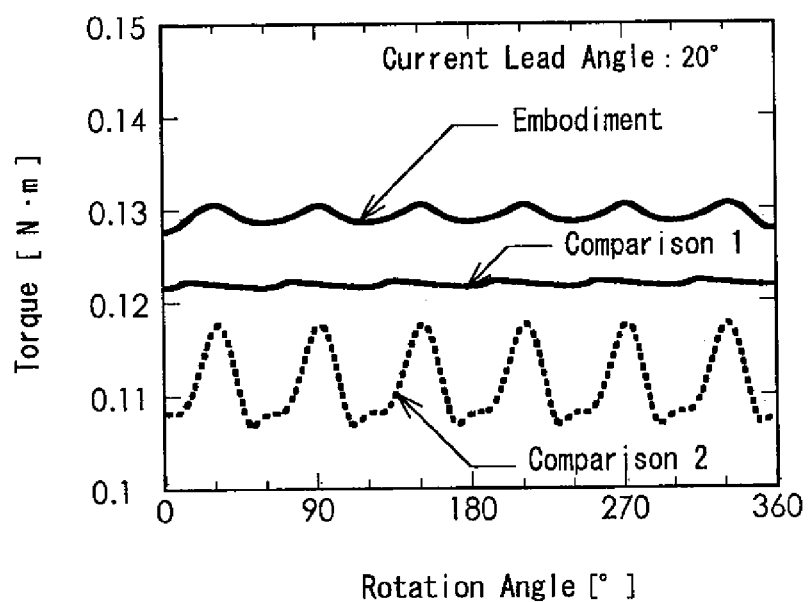
FIG. 8 illustrates a relationship between the torque and rotation angle of a rotor of each motor used in the experiment when the current lead angle is 20 degrees.
Figure 9:
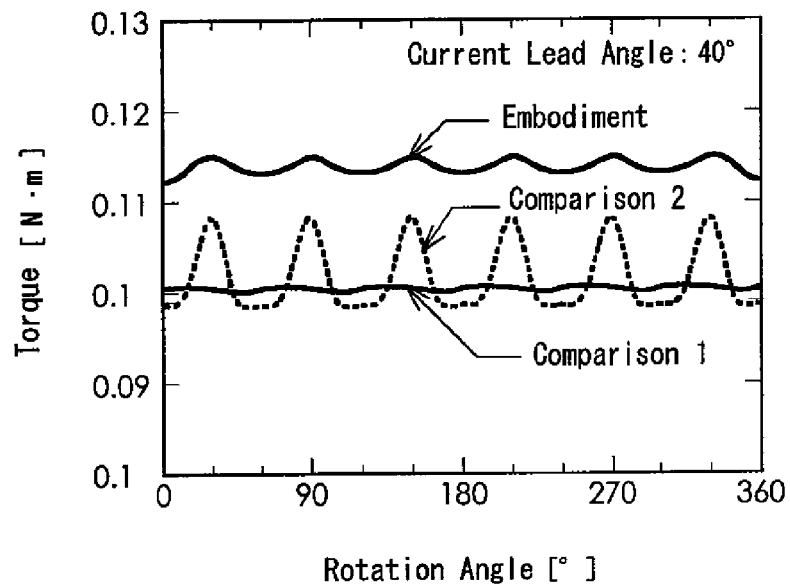
FIG. 9 illustrates a relationship between the torque and rotation angle of a rotor of each motor used in the experiment when the current lead angle is 40 degrees.
Figure 10:
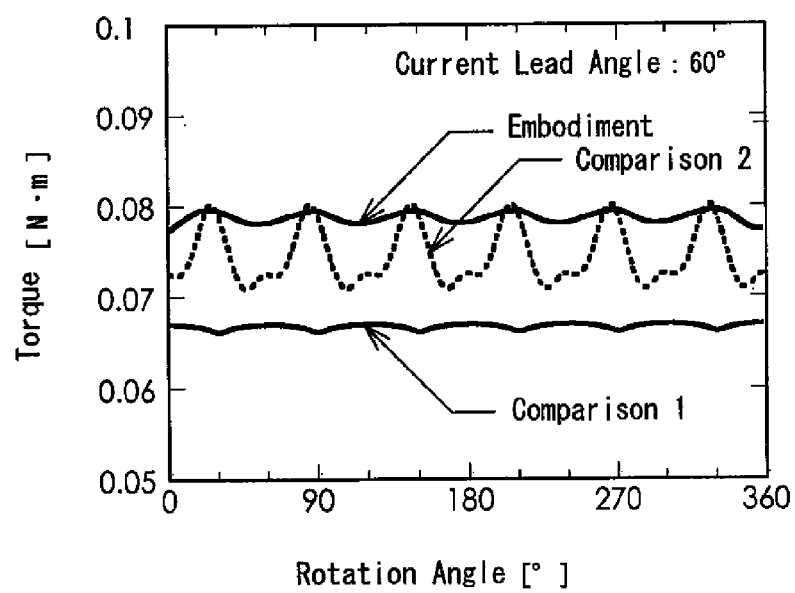
FIG. 10 illustrates a relationship between the torque and rotation angle of a rotor of each motor used in the experiment when the current lead angle is 60 degrees.
Figure 20:
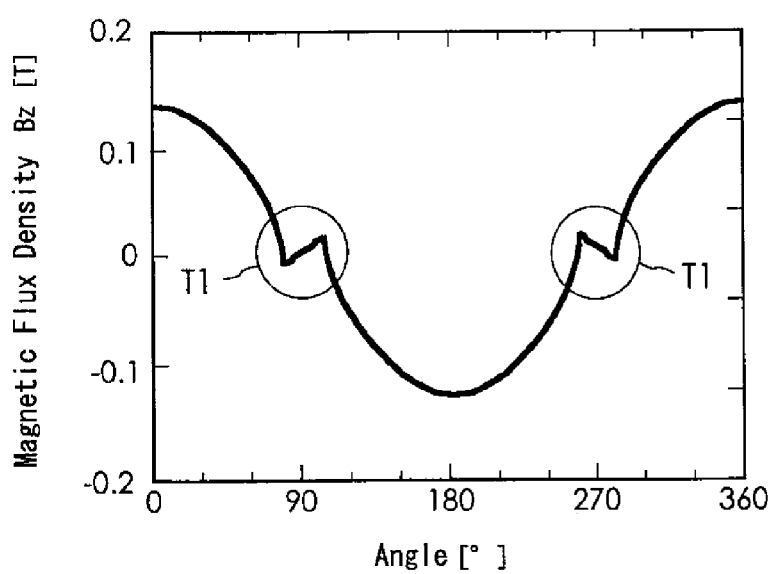
FIG. 20 illustrates a flux density wave detected by a Hall element for detecting a magnetic pole position for the permanent magnet rotary motor using the rotor shown in FIG. 19.
Figure 21:
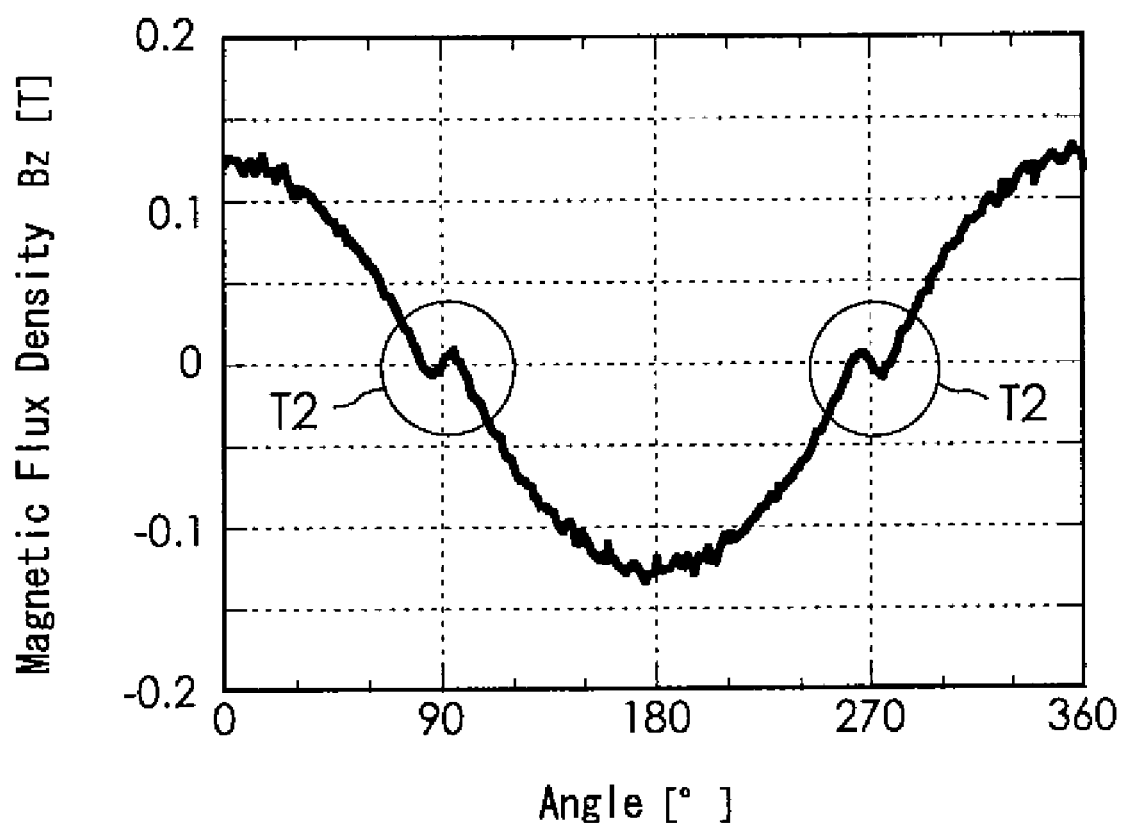
FIG. 21 illustrates the flux density wave detected by the Hall element for detecting a magnetic pole position for the permanent magnet rotary motor using the rotor shown in FIG. 18.

FIG. 6 illustrates a flux density waveform (a waveform indicative of a relationship between the rotation angle of the rotor and density of magnetic flux leaking out from the gap in the axial direction) of leakage flux leaking out from the second divided rotor magnetic pole unit, detected by the Hall element for detecting a magnetic pole position in the motor of the present embodiment. As known from FIG. 6, disturbance of magnetic flux shown in FIGS. 20 and 21 is substantially not generated in the flux density wave of the motor according to the present embodiment. That is, the waveform of the flux density wave is close to a sine wave. The wave indicated with a broken line shown in FIG. 6 is a flux density wave when the spacer is not inserted in the gap.

Figure 11:
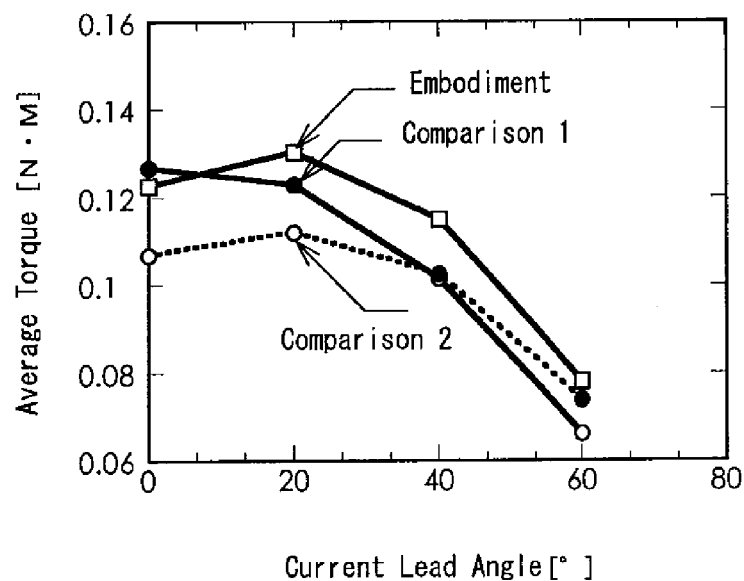
FIG. 11 illustrates a relationship between the average torque and current lead angle of each motor used in the experiment.
Figure 18:
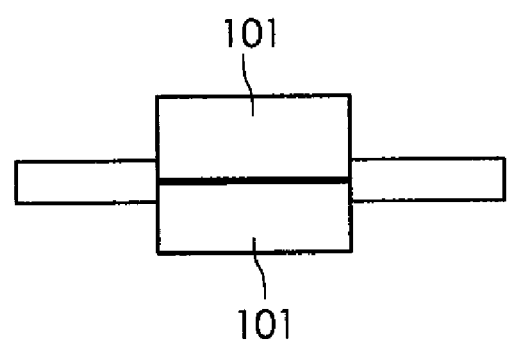
FIG. 18 is a top plan view of a rotor for motors of one conventional example.
Figure 19:
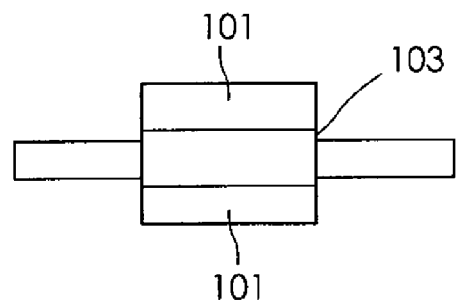
FIG. 19 is a top plan view of a rotor for motors of another conventional example.

Next, a relationship between the rotation angle of a rotor and magnitude of torque was investigated, using a motor of the present embodiment (motor of the present invention), a motor using the rotor shown in FIG. 18 (motor of a comparative example or comparison 1), and a motor using the rotor shown in FIG. 19 (motor of another comparative example or comparison 2). FIGS. 7 to 10 respectively illustrate the relationship between the rotation angle of the rotor and torque of each motor, when a current lead angle is 0 degree, 20 degrees, 40 degrees, and 60 degrees. FIG. 11 illustrates relationship between the current lead angle and average torque of each motor. As known from FIGS. 7 to 11, when the current lead angle is 0 degree, the motor of the comparison 1 has the highest torque. On the other hand, when the current lead angle is 20 degrees, 40 degrees, or 60 degrees respectively, the motor of the embodiment has higher torque than those of the comparative examples, comparison 1 and comparison 2. In addition, it is known that torque ripples are smaller in the motor according to the embodiment of the present invention than those of the comparison 2 at each of the current lead angles.

Figure 12:
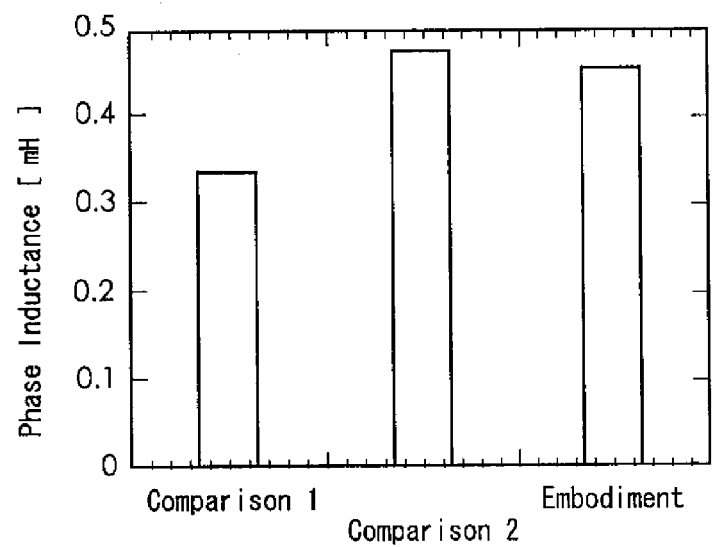
FIG. 12 illustrates phase inductances of the motor according to the embodiment of the present invention and motors of comparative examples or comparisons 1 and 2.

FIG. 12 illustrates phase inductances of the motor of the embodiment and motors of the comparative examples, comparison 1 and comparison 2. It is known from this illustration that the motor of the embodiment has a larger phase inductance than that of the comparison 1, and has a phase inductance which is not largely different from that of the comparison 2. Accordingly, it is understood that the motor of the embodiment may suppress generation of high-frequency current ripples caused by carrier frequency of an inverter and may suppress an increase of higher harmonic iron loss.

Figure 13:
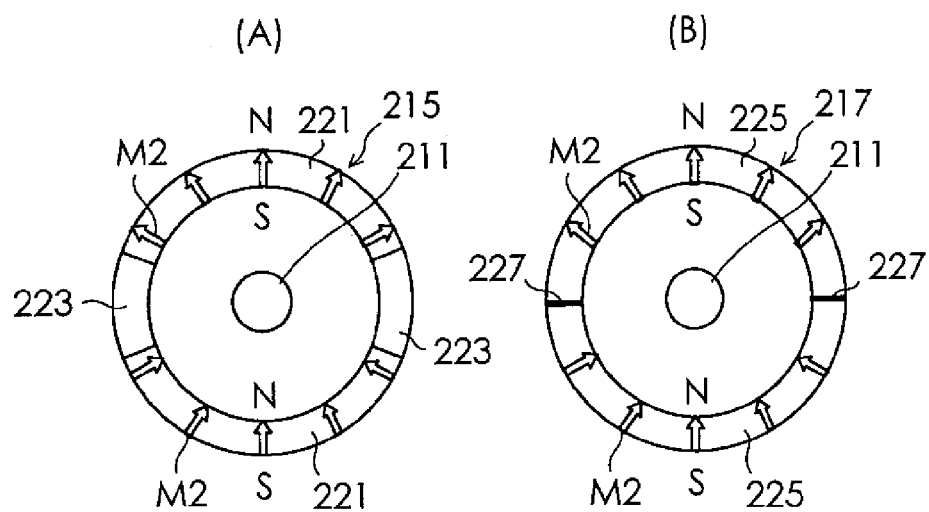
FIGS. 13A and 13B are respectively cross-sectional views of first and second divided rotor magnetic pole units of a rotor for a permanent magnet rotary motor according to another embodiment of the present invention.
Figure 14:
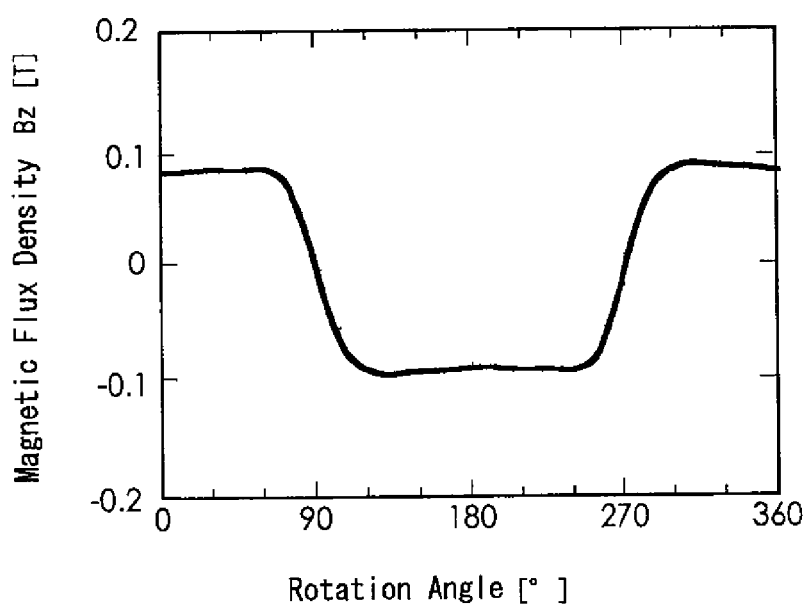
FIG. 14 illustrates a flux density wave, which is detected by the Hall element for detecting a magnetic pole position for the permanent magnet rotary motor using the rotor shown in FIG. 13.

FIGS. 13A and 13B are respectively cross-sectional views of first and second divided rotor magnetic pole units 215, 217 of a rotor of a permanent magnet rotary motor according to another embodiment of the present invention. For easier understanding, hatching denoting a cross section is omitted in FIGS. 13A and 13B. In the rotor for motors of this embodiment, permanent magnet magnetic pole portions 221, 225 of the first and second kinds are respectively magnetized so that magnetization directions thereof (arrows M2) may be oriented in the radial directions of the rotary shaft 211, which is called as radial magnetization orientation. The other parts are substantially the same as those of the rotor for motors shown in FIGS. 1 to 4. FIG. 14 illustrates a flux density wave detected by a Hall element for detecting a magnetic pole position for the motor of this embodiment. As shown in FIG. 14, disturbance of magnetic flux as shown in FIGS. 20 and 21 is not generated in the flux density wave of the motor of this embodiment, but the waveform becomes a square wave.

Figure 15:
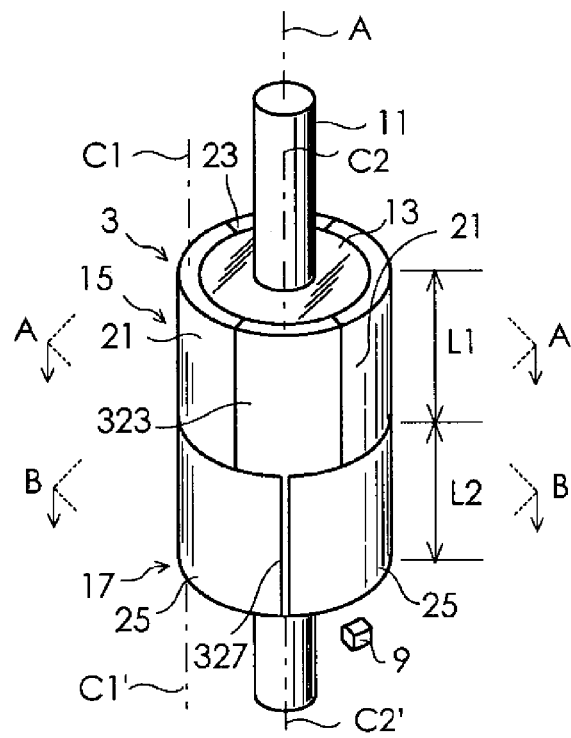
FIG. 15 is a perspective view of a rotor for motors used for a permanent magnet rotary motor according to a further embodiment of the present invention.
Figure 16:
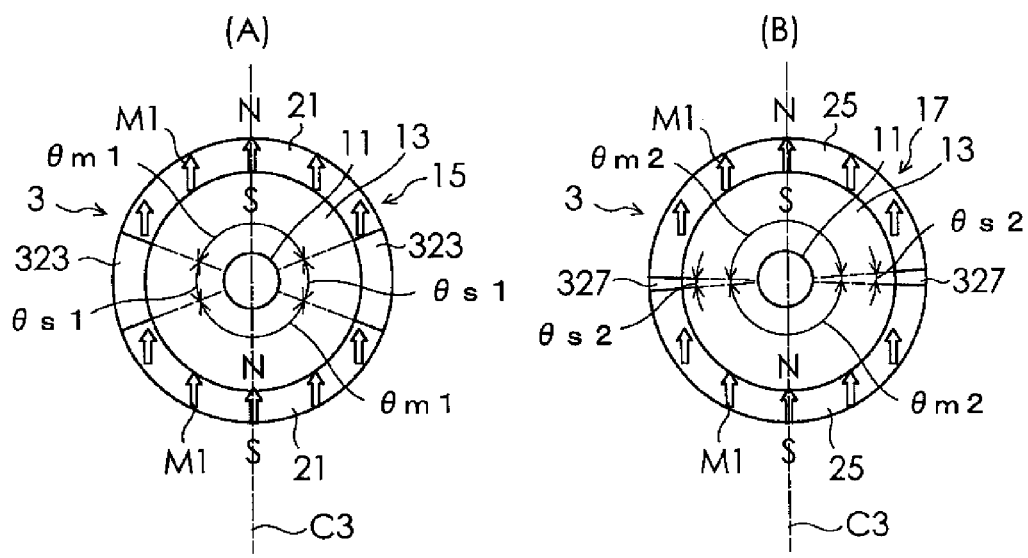
FIGS. 16A and 16B are cross-sectional views taken along lines A-A and B-B of FIG. 15, respectively.
Figure 17:
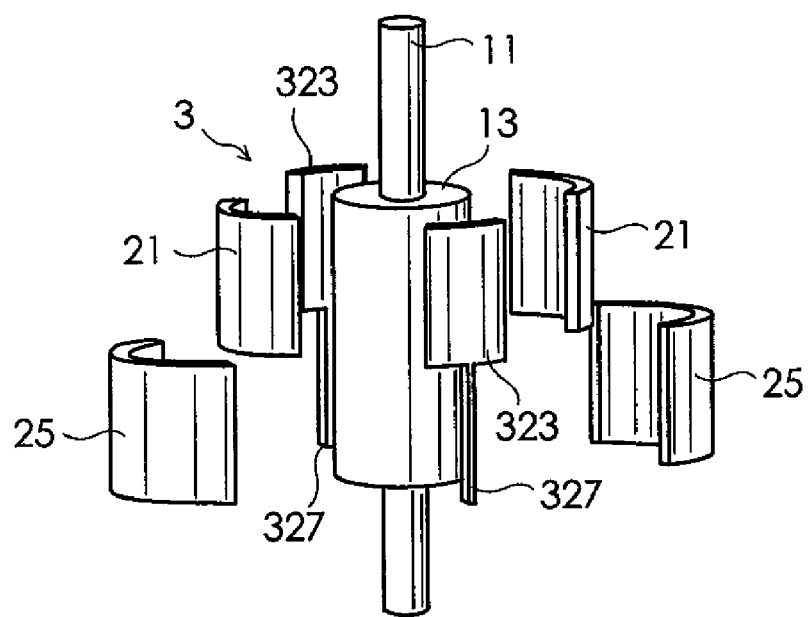
FIG. 17 is an exploded view of the rotor for motors shown in FIG. 15.

FIG. 15 is a perspective view of a rotor 3 for motors of a permanent magnet rotary motor according to a further embodiment of the present invention. FIGS. 16A and 16B are cross-sectional views taken along lines A-A and B-B of FIG. 15, respectively. FIG. 17 is an exploded view of the rotor 3 for motors. In the rotor for motors of this embodiment, a salient pole portion 323 and a spacer 327 are integrally formed. As shown in FIGS. 15 to 17, the rotor 3 for motors includes the rotary shaft 11, the rotor core 13, the first divided rotor magnetic pole unit 15, the second divided rotor magnetic pole unit 17, and the protective layer 19. The rotor core 13 is cylindrical in shape and is integrally disposed on the central portion of the rotary shaft 11 in the axial direction thereof. The first divided rotor magnetic pole unit 15 includes P (P is a positive even number, two in this case) permanent magnet magnetic pole portions 21 of the first kind and P (P is the positive even number, two in this case) salient pole portions 323 made of a magnetic material, and the permanent magnet magnetic pole portions 21 and the salient pole portions 323 are alternately disposed on a part of the surface of the rotor core 13 in a circumferential direction of the rotary shaft 11. The second divided rotor magnetic pole unit 17 includes P (P is the positive even number, two in this case) permanent magnet magnetic pole portions 25 of the second kind and P (P is the positive even number, two in this case) spacers 327 made of a soft magnetic material, and the permanent magnet magnetic pole portions 25 and the spacers 327 are alternately disposed on another part of the surface of the rotor core 13 in the circumferential direction of the rotary shaft 11. According to this embodiment, the salient pole portion 323 and the spacer 327 are integrally formed. The spacer 327 is inserted in a gap, which is formed due to manufacturing size precision between two adjacent permanent magnet magnetic pole portions 25 of the second kind. In this embodiment, the permanent magnet magnetic pole portions 21, 25 of the first and second kinds are formed by one permanent magnet respectively. As shown in FIG. 15, the first divided rotor magnetic pole unit 15 and the second divided rotor magnetic pole unit 17 are disposed side by side in an axial direction of the rotary shaft 11 so that a first virtual centerline C1 extending along an axis line A of the rotary shaft 11 and passing through the center of the permanent magnet magnetic pole portion 21 of the first kind may coincide with a second virtual centerline C1' extending along the axis line A and passing through the center of the permanent magnet magnetic pole portion 25 of the second kind, and a fourth virtual centerline C2 extending along the axis line A and passing through the center of the salient pole portion 323 may coincide with a fifth virtual centerline C2' extending along the axis line A and passing through the center of the spacer 327.

As shown in FIG. 16, the permanent magnet magnetic pole portions 21 of the first kind and the permanent magnet magnetic pole portions 25 of the second kind are respectively magnetized so that magnetization directions (arrows M1) thereof may be oriented in parallel to a third virtual centerline C3 which passes through the center of the rotary shaft 11 and the center of the permanent magnet magnetic pole portion.

In addition, a length L1 of the first divided rotor magnetic pole unit 15 in the axial direction is equal to a length L2 of the second divided rotor magnetic pole unit 17 in the axial direction. It is preferred that a ratio of the length L1 to the length L2 (L1/L2) is in the range of 0.75 to 1. The salient pole portion 323 and the spacer 327 are integrally molded as one component by compaction molding ferrous-metal powder with a press, and provided separately from the rotor core 13.

As shown in FIG. 16, a pole arc angle θm1 of the permanent magnet magnetic pole portion 21 of the first kind is smaller than the pole arc angle θm2 of the permanent magnet magnetic pole portion 25 of the second kind, and an open angle θs1 of the salient pole portion 323 is larger than the open angle θs2 of the spacer 327. Specifically, a ratio of the pole arc angle θm1 of the permanent magnet magnetic pole portion 21 of the first kind to the open angle θs1 of the salient pole portion 323 (θm1/θs1) is a value within the range of 1.5 to 2.5. The arc length of the outer circumference of the spacer 327 is preferably 1 mm or less. In this case, when a radius of an imaginary circle including the outer circumference of the spacer is defined as R, the ratio of pole arc angle θm2 of the permanent magnet magnetic pole portion 25 of the second kind to the open angle θs2 of the spacer 327 (θm2/θs2) is (πR−1) or more, where π is pi (the ratio of a circle's circumference to its diameter).

In this embodiment, the open angle θs1 of the salient pole portion 323 is 54 degrees, and the open angle θs2 of the spacer 327 is 4.5 degrees.

Alternatively, the ratio of the pole arc angle θm1 of the permanent magnet magnetic pole portion of the first kind to the open angle θs1 of the salient pole portion (θm1/θs1) may be within a range of 4.5 to 7.5, and the arc length of the outer circumference of the spacer may be 1 mm or less. In this case, it is preferred that the ratio of the length L1 of the first divided rotor magnetic pole unit in the axial direction to the length L2 of the second divided rotor magnetic pole unit in the axial direction (L1/L2) is in the range of 1 to 1.33.

In each of the above-mentioned embodiments, the salient pole portion 23 and rotor core 13 are separately provided. The salient pole portion may integrally be provided with the rotor core.

In each of the above-mentioned embodiments, the permanent magnet magnetic pole portions 21, 25 of the first and second kinds are respectively formed by one permanent magnet, and the salient pole portion 23, 223, 323 is also formed by one permanent magnet. The permanent magnet magnetic pole portions 21, 25 of the first and second kinds may respectively be formed by a plurality of permanent magnets, and the salient pole portion 23 may also be formed by a plurality of permanent magnets. Further, the present invention is not limited to the above-mentioned embodiments, but variations and modifications may be made without departing from the scope of the present invention.

What is claimed is:
1. A rotor for motors comprising:
a rotor core disposed on a rotary shaft,
a first divided rotor magnetic pole unit including P, wherein P is a positive even number, first permanent magnet magnetic pole portions and P, wherein P is the positive even number, salient pole portions made of a magnetic material; the first permanent magnet magnetic pole portions and the salient pole portions being alternately disposed on a surface of the rotor core in a circumferential direction of the rotary shaft, and
a second divided rotor magnetic pole unit including P, wherein P is the positive even number, second permanent magnet magnetic pole portions disposed adjacent to each other on the surface of the rotor core in the circumferential direction of the rotary shaft,
the first divided rotor magnetic pole unit and the second divided rotor magnetic pole unit being disposed side by side in an axial direction of the rotary shaft so that a first virtual centerline extending along an axis line of the rotary shaft and passing through the center of the first permanent magnet magnetic pole portion capable to coincide with a second virtual centerline extending along the axis line and passing through the center of the second permanent magnet magnetic pole portion wherein a gap is formed due to size precision of the permanent magnet magnetic pole portion, between two adjacent permanent magnet magnetic pole portions of the P the second permanent magnet magnetic pole portions in the second divided rotor magnetic pole unit; and a spacer made of a soft magnetic material is disposed in the gap.

2. The rotor for motors according to claim 1, wherein a width of the gap in the circumferential direction is 1.0 mm or less.

3. The rotor for motors according to claim 1, wherein a ratio of a pole arc angle θm of the first permanent magnet magnetic pole portion to an open angle θs of the salient pole portion (that is, θm/θs) is in the range of 1.5 to 2.5, and a ratio of a length L1 of the first divided rotor magnetic pole unit in the axial direction to a length L2 of the second divided rotor magnetic pole unit in the axial direction (that is, L1/L2) is in the range of 0.75 to 1.

4. The rotor for motors according to claim 3, wherein the length L1 of the first divided rotor magnetic pole unit in the axial direction is equal to the length L2 of the second divided rotor magnetic pole unit in the axial direction.

5. The rotor for motors according to claim 1, wherein the first permanent magnet magnetic pole portions and the second permanent magnet magnetic pole portions are respectively magnetized so that magnetization directions thereof may be oriented in parallel to a third virtual centerline which passes through the center of the rotary shaft and the center of the first or second permanent magnet magnetic pole portion, and is orthogonal to the first or second virtual centerline.

6. The rotor for motors according to claim 1, wherein a protective layer is provided on outer circumferential surfaces of the first and second rotor magnetic pole units, the protective layer being formed by winding a yarn made of a reinforced fiber material around the outer circumferential surfaces, and impregnating the yarn with an adhesive agent to fix the yarn thereto.

7. The rotor for motors according to claim 1, being intended for use in a high speed rotary motor, wherein the rotary shaft rotates at a high speed of 150,000 rotations per minute or more.

8. A permanent magnet rotary motor comprising the rotor for motors according to claim 1, wherein
a Hall element for detecting a magnetic pole position for the rotor for motors is disposed to measure leakage flux leaking out from the second permanent magnet magnetic pole portion.

9. A permanent magnet rotary motor comprising the rotor for motors according to claim 2, wherein
a Hall element for detecting a magnetic pole position for the rotor for motors is disposed to measure leakage flux leaking out from the second permanent magnet magnetic pole portion.

10. A permanent magnet rotary motor comprising the rotor for motors according to claim 3, wherein
a Hall element for detecting a magnetic pole position for the rotor for motors is disposed to measure leakage flux leaking out from the second permanent magnet magnetic pole portion.

11. A permanent magnet rotary motor comprising the rotor for motors according to claim 4, wherein
a Hall element for detecting a magnetic pole position for the rotor for motors is disposed to measure leakage flux leaking out from the second permanent magnet magnetic pole portion.

12. A permanent magnet rotary motor comprising the rotor for motors according to claim 5, wherein
a Hall element for detecting a magnetic pole position for the rotor for motors is disposed to measure leakage flux leaking out from the second permanent magnet magnetic pole portion.

13. A permanent magnet rotary motor comprising the rotor for motors according to claim 6, wherein
a Hall element for detecting a magnetic pole position for the rotor for motors is disposed to measure leakage flux leaking out from the second permanent magnet magnetic pole portion.

14. A permanent magnet rotary motor comprising the rotor for motors according to claim 7, wherein
a Hall element for detecting a magnetic pole position for the rotor for motors is disposed to measure leakage flux leaking out from the second permanent magnet magnetic pole portion.

* * * * *